United States Patent
Lee et al.

(10) Patent No.: US 10,367,625 B2
(45) Date of Patent: Jul. 30, 2019

(54) HYBRID BEAMFORMING METHOD AND APPARATUS FOR MULTI-RANK SUPPORT IN WIRELESS ACCESS SYSTEM

(71) Applicant: LG ELECTRONICS INC., Seoul (KR)

(72) Inventors: Hyunho Lee, Seoul (KR); Hyukjin Chae, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 15/308,065

(22) PCT Filed: Jun. 29, 2015

(86) PCT No.: PCT/KR2015/006632
§ 371 (c)(1),
(2) Date: Oct. 31, 2016

(87) PCT Pub. No.: WO2016/003133
PCT Pub. Date: Jan. 7, 2016

(65) Prior Publication Data
US 2017/0054543 A1 Feb. 23, 2017

Related U.S. Application Data

(60) Provisional application No. 62/020,401, filed on Jul. 3, 2014.

(51) Int. Cl.
*H04L 5/00* (2006.01)
*H04B 7/06* (2006.01)
(Continued)

(52) U.S. Cl.
CPC ......... *H04L 5/0057* (2013.01); *H04B 7/0417* (2013.01); *H04B 7/0456* (2013.01);
(Continued)

(58) Field of Classification Search
None
See application file for complete search history.

(56) References Cited

U.S. PATENT DOCUMENTS 7,602,837 B2 * 10/2009 Kotecha ............... H04B 7/0452
375/148
9,681,425 B2 * 6/2017 Geirhofer ............ H04B 7/0621
(Continued)

FOREIGN PATENT DOCUMENTS

WO 2013115605 8/2013

OTHER PUBLICATIONS

PCT International Application No. PCT/KR2015/006632, Written Opinion of the International Searching Authority dated Oct. 26, 2015, 24 pages.
(Continued)

*Primary Examiner* — Donald L Mills
(74) *Attorney, Agent, or Firm* — Lee Hong Degerman Kang Waimey

(57) ABSTRACT

Provided is a method by a first transmitting node transmitting, in cooperation with two other transmitting nodes, radio signals using two radio resource units to three receiving nodes which the respective transmitting nodes serve, the method being performed by the first transmitting node and comprising: establishing, for a first receiving node, a CSI-RS resource and a CSI-IM resource; receiving, from the first receiving node, a first recommended PMI for the first transmitting node according to information measured in the CSI-RS resource and the CSI-IM resource, and receiving, from the remaining two transmitting node, a second recommended PMI for the first transmitting node, which has been reported from the remaining two receiving nodes; and muting at a first wireless resource unit among the two wireless resource units, and transmitting, at the second
(Continued)

wireless resource unit, a wireless signal based on the first recommended PMI or the second recommended PMI.

15 Claims, 7 Drawing Sheets

(51) Int. Cl.
    *H04B 7/0417*     (2017.01)
    *H04B 7/0456*     (2017.01)

(52) U.S. Cl.
    CPC ............. *H04B 7/0639* (2013.01); *H04L 5/00* (2013.01); *H04L 5/0048* (2013.01)

(56) References Cited

U.S. PATENT DOCUMENTS

| | | | |
|---|---|---|---|
| 2013/0286964 A1 | 10/2013 | Chu | |
| 2013/0301560 A1* | 11/2013 | Geirhofer | H04B 7/0621 370/329 |
| 2014/0036796 A1 | 2/2014 | Etemad et al. | |
| 2014/0126402 A1* | 5/2014 | Nam | H04W 24/08 370/252 |
| 2014/0133333 A1* | 5/2014 | Liu | H04W 24/10 370/252 |
| 2015/0043439 A1* | 2/2015 | Sajadieh | H04W 76/14 370/329 |
| 2015/0131604 A1* | 5/2015 | Hammarwall | H04L 1/0026 370/330 |
| 2015/0139009 A1* | 5/2015 | Park | H04W 72/1231 370/329 |
| 2016/0182198 A1* | 6/2016 | Won | H04L 5/0035 370/329 |

OTHER PUBLICATIONS

3rd Generation Partnership Project (3GPP), "Technical Specification Group Radio Access Network; Evolved Universal Terrestrial Radio Access (E-UTRA); Physical layer procedures (Release 12)," 3GPP TS 36.213 V12.1.0, Mar. 2014, 187 pages.

* cited by examiner

Pattern A  Pattern B

HYBRID BEAMFORMING METHOD AND APPARATUS FOR MULTI-RANK SUPPORT IN WIRELESS ACCESS SYSTEM

CROSS-REFERENCE TO RELATED APPLICATIONS

This application is the National Stage filing under 35 U.S.C. 371 of International Application No. PCT/KR2015/006632, filed on Jun. 29, 2015, which claims the benefit of U.S. Provisional Application No. 62/020,401, filed on Jul. 3, 2014, the contents of which are all hereby incorporated by reference herein in their entirety.

TECHNICAL FIELD

The present invention relates to a wireless communication system, and more particularly, to a method of transmitting or receiving a wireless signal and apparatus therefor.

BACKGROUND ART

Various devices (e.g., smartphones, tablet PCs, etc.) and technologies requiring Machine-to-Machine (M2M) communications and high data throughputs continue to appear and tend to be popularized. And, a data amount necessary to be processed on a cellular network is increasing very fast. In order to meet the fast increasing data processing requirement amount, technologies (e.g., carrier aggregation technology, cognitive radio technology, etc.) for using more frequency bands efficiently and technologies (e.g., multi-antenna technology, multi-base station cooperation technology, etc.) for increasing data capacity transmitted within a limited frequency are developed. And, a communication environment is evolved in a direction of increasing density of nodes accessible by a nearby user equipment. A node means a fixed point capable of transmitting/receiving a radio signal to/from a user equipment by being equipped with at least one antenna. A communication system equipped with nodes of high density can provide a user equipment with a communication service of high performance by cooperation between the nodes.

According to the multinode cooperative communication scheme of performing communication with a user equipment using the same time-frequency resource at a plurality of nodes, since each node operates as an independent base station, such a scheme has performance much better than that of an existing communication scheme of performing communication with a user equipment without mutual cooperation.

A multinode system performs a cooperative communication using a plurality of nodes that operate as a base station (or, access point), an antenna, an antenna group, a radio remote header (RRH) and a radio remote unit (RRU). Unlike the existing center concentrated antenna system having antennas concentrated on a base station, a plurality of the nodes in the multinode system are located in a manner of being spaced apart from each other over a predetermined interval. A plurality of the nodes can be operated by at least one base station or a base station controller configured to control an operation of each node or schedule data to be transmitted/received through each node. And, each of the nodes is connected to the base station or the base station controller configured to operate the corresponding node through a cable or a dedicated line.

Such a multinode system may be regarded as a sort of MIMO (multiple input multiple output) system in that distributed nodes can communicate with single or multiple users by transmitting/receiving different streams simultaneously. Yet, since the multinode system transmits a signal using the nodes distributed to various locations, a transmitting area supposed to be covered by each antenna is reduced in comparison with antennas provided to an existing centralized antenna system. Hence, compared to the existing system capable of implementing the MIMO technology in the centralized antenna system, the multinode system can reduce a transmit power required for each antenna to transmit a signal. Moreover, since a transmitting distance between an antenna and a user equipment is reduced, a pathloss is reduced and a fast transmission of data is enabled. Hence, transmission capacity and power efficiency of a cellular system can be raised and a communication performance of a relatively uniform quality can be met irrespective of a location of a user equipment within a cell. In the multinode system, since base station(s) or base station controller(s) connected to a plurality of nodes cooperates for data transmission/reception, a signal loss generated from a transmitting process is reduced. In case that nodes located by being spaced apart from each other over a predetermined distance perform cooperative communication with a user equipment, correlation and interference between antennas are reduced. Hence, according to the multinode cooperative communication scheme, it is able to obtain a high SINR (signal to interference-plus-noise ratio).

Owing to the advantages of the multinode system mentioned in the above description, in order to extend a service coverage and improve channel capacity and SINR as well as reduce a base station establishment cost and a maintenance cost of a backhaul network in a next generation mobile communication system, the multinode system is used together with or substituted with the existing centralized antenna system, thereby emerging as a new base of a cellular communication.

DISCLOSURE OF THE INVENTION

Technical Task

The present invention relates to a method of transmitting or receiving a wireless signal and apparatus therefor, and more particularly, to a method or apparatus for satisfying a required performance using a transmission pattern of a plurality of transmitting nodes for a plurality of receiving nodes.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method for a first transmitting node to transmit a radio signal to three receiving nodes respectively served by the first transmitting node and two other transmitting nodes in coordination with the two other transmitting nodes using two radio resource units in a wireless communication system, the method performed by the first transmitting node, the method including configuring a channel state information-reference signal (CSI-RS) resource and a CSI-interference measurement (CSI-IM) resource for a first receiving node, receiving, from the first receiving node, a first recommended precoding matrix index (PMI) for the first transmitting node according to information measured on the CSI-RS resource and the CSI-IM resource and receiving, from two remaining transmitting nodes of the three transmitting nodes, a second recommended PMI for the first transmitting node having been reported by two remaining receiving nodes, and muting in a first radio resource unit of the two radio resource units and transmitting the radio signal in a second radio resource unit of the two radio resource units based on either the first recommended PMI or the second recommended PMI.

Additionally or alternatively, the CSI-IM resource may include a first CSI-IM resource designated for the first transmitting node and a third transmitting node to transmit a zero-power CSI-RS and a second CSI-IM resource designated for the first transmitting node and a second transmitting node to transmit the zero-power CSI-RS.

Additionally or alternatively, a recommended PMI to be used for the second radio resource unit by the first transmitting node may be determined by the first receiving node using the information measured on the first CSI-IM resource and the information measured on the CSI-RS resource.

Additionally or alternatively, a recommended PMI to be used for the first radio resource unit by the third transmitting node may be determined by the first receiving node using the information measured on the second CSI-IM resource.

Additionally or alternatively, the method may further include receiving a recommended PMI for a third transmitting node from the first receiving node.

Additionally or alternatively, a recommended PMI for the first transmitting node may indicate a precoding matrix enabling an interference not to affect at least one of the two remaining transmitting nodes.

Additionally or alternatively, the first radio resource unit and the second radio resource unit may be contiguous with each other in a time or frequency domain.

Additionally or alternatively, the three transmitting nodes may transmit different radio signals either in the first radio resource unit or in the second radio resource unit, respectively.

Additionally or alternatively, a second transmitting node among the three transmitting nodes may transmit a same radio signal in e the first radio resource unit and the second radio resource unit.

In another technical aspect of the present invention, provided herein is a method of receiving a radio signal from three transmitting nodes configured to coordinate with each other using two radio resource units in a wireless communication system, the method performed by a first receiving node among three receiving nodes, the method including receiving configurations of a channel state information-reference signal (CSI-RS) resource and a CSI-interference measurement (CSI-IM) resource from a first transmitting node, reporting a recommended precoding matrix index (PMI) for the first transmitting node according to information measured on the CSI-RS resource and the CSI-IM resource and a recommended PMI for a different one of the 3 transmitting nodes to the first transmitting node, and receiving the radio signal based on the recommended PMI in a first radio resource unit or in a second radio resource unit from the first transmitting node.

Additionally or alternatively, the CSI-IM resource may include a first CSI-IM resource designated for the first transmitting node and a third transmitting node to transmit a zero-power CSI-RS and a second CSI-IM resource designated for the first transmitting node and a second transmitting node to transmit the zero-power CSI-RS.

Additionally or alternatively, a recommended PMI to be used for the second radio resource unit by the first transmitting node is determined by the first receiving node using the information measured on the first CSI-IM resource and the information measured on the CSI-RS resource.

Additionally or alternatively, a recommended PMI to be used for the first radio resource unit by the third transmitting node may be determined by the first receiving node using the information measured on the second CSI-IM resource.

Additionally or alternatively, the method may further include transmitting a recommended PMI for a third transmitting node to the first transmitting node.

Additionally or alternatively, the recommended PMI for the first transmitting node may indicate a precoding matrix enabling an interference not to affect at least one of the rest of the two remaining transmitting nodes.

Additionally or alternatively, the first radio resource unit and the second radio resource unit may be contiguous with each other in a time or frequency domain.

Additionally or alternatively, the three transmitting nodes may transmit different radio signals in the first radio resource unit or in the second radio resource unit, respectively.

Additionally or alternatively, a second transmitting node among the three transmitting nodes may transmit a same radio signal in each of the first radio resource unit and the second radio resource unit.

The technical solutions just include embodiments of the present invention in part, and various embodiments reflecting the technical features of the present invention can be derived and understood by those skilled in the art, to which the corresponding technical field pertains, based on the detailed description of the present invention in the following.

Advantageous Effects

According to one embodiment of the present invention, it is possible to achieve a desired performance through a specific transmission pattern.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
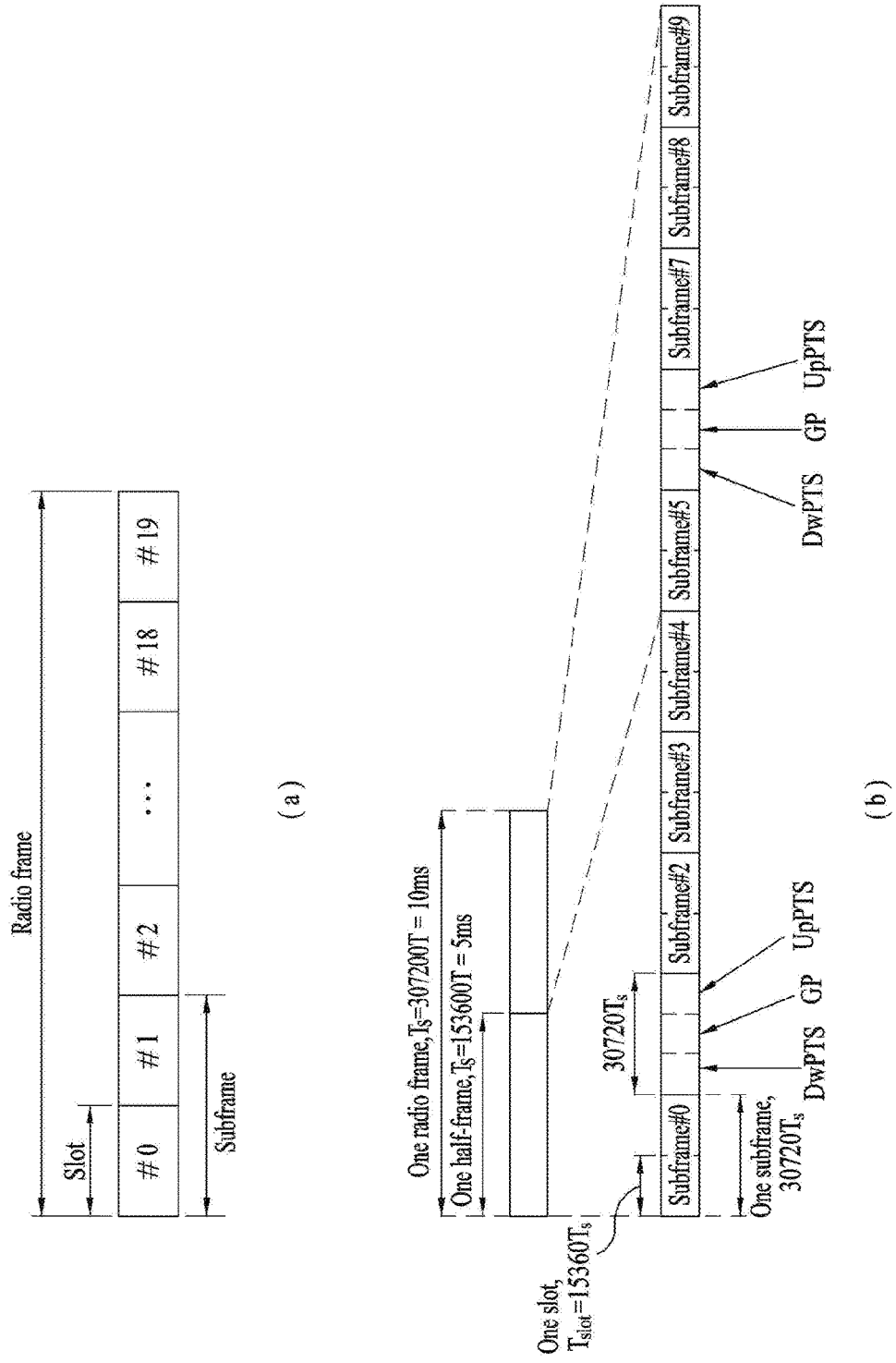
FIG. 1 shows one example of a radio frame structure used by a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |

TABLE 2-continued

|  | Normal cyclic prefix in downlink | | | Extended cyclic prefix in downlink | | |
|---|---|---|---|---|---|---|
|  |  | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 4 | $26336 \cdot T_s$ |  |  | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ |  |  |
| 6 | $19760 \cdot T_s$ |  |  | $23040 \cdot T_s$ |  |  |
| 7 | $21952 \cdot T_s$ |  |  | $12800 \cdot T_s$ |  |  |
| 8 | $24144 \cdot T_s$ |  |  | — | — | — |
| 9 | $13168 \cdot T_s$ |  |  | — | — | — |

Figure 2:
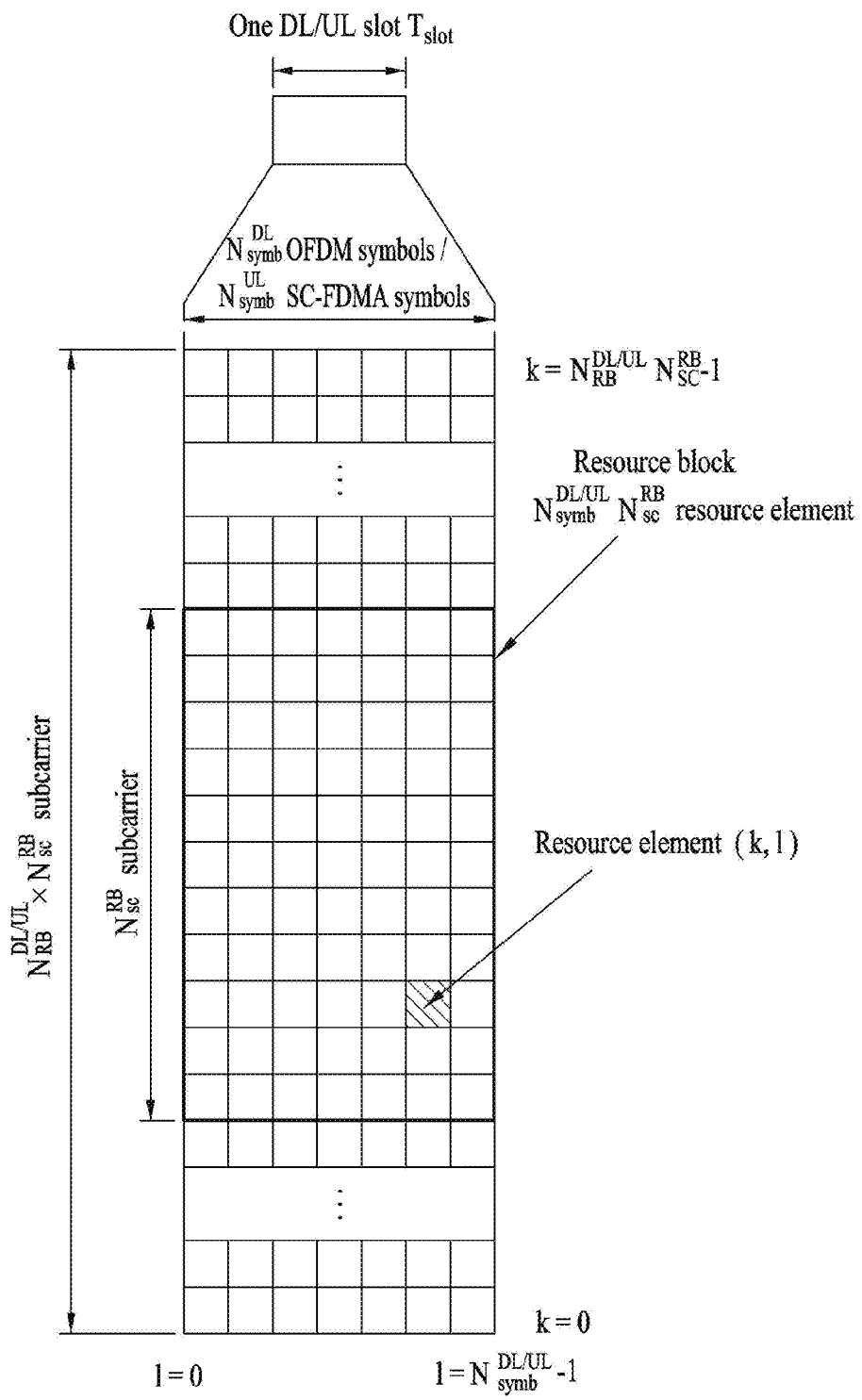
FIG. 2 shows one example of an uplink/downlink (UL/DL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
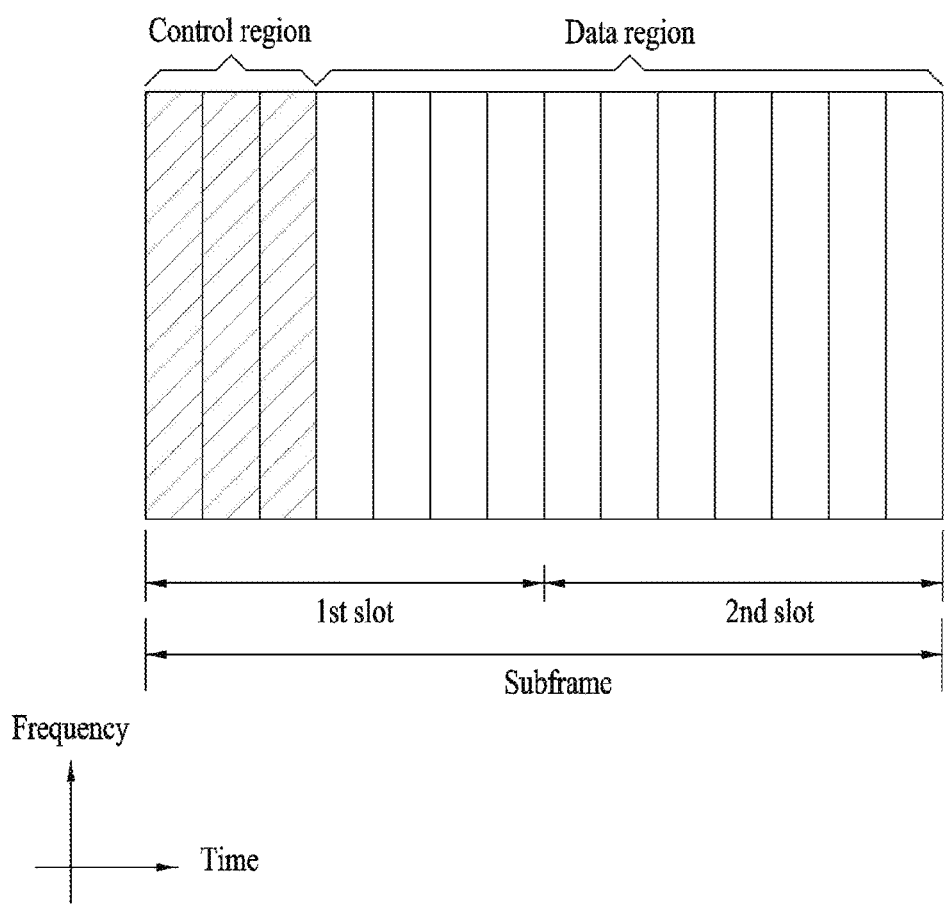
FIG. 3 shows one example of a downlink (DL) subframe structure used by 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
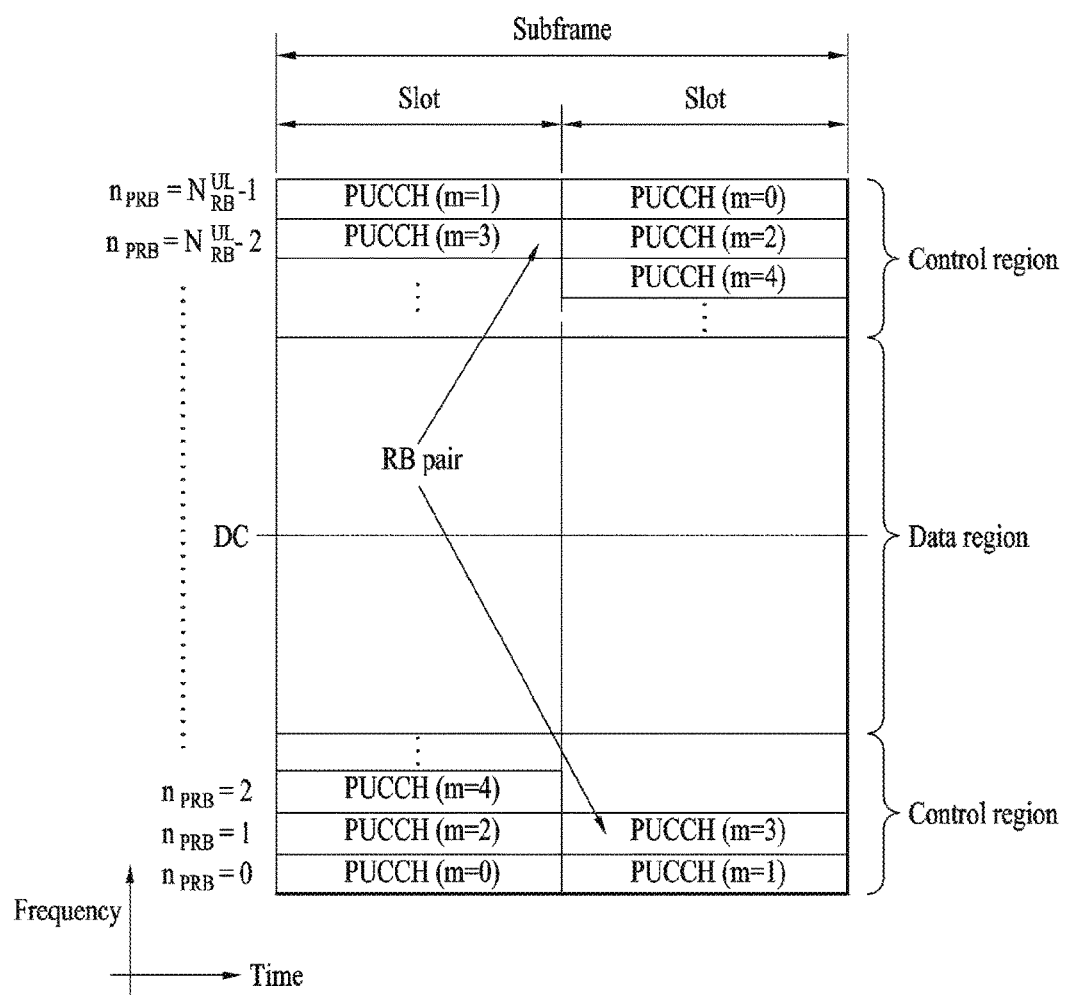
FIG. 4 shows one example of an uplink (UL) subframe structure used by 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |

TABLE 4-continued

| PUCCH format | Modulation scheme | Number of bits per subframe, $M_{bit}$ | Usage | Etc. |
| --- | --- | --- | --- | --- |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

CSI-RS(Channel State Information-Reference Signal)

In 3GPP LTE(-A), the antenna port configured to transmit CSI-RS is referred to as a CSI-RS port, and the position of a resource contained in a predetermined resource region in which CSI-RS port(s) transmit(s) the corresponding CSI-RS(s) is referred to as a CSI-RS pattern or a CSI-RS resource configuration. In addition, time-frequency resources through which CSI-RS is allocated/transmitted are referred to as CSI-RS resources. For example, a resource element (RE) used for CSI-RS transmission is referred to as CSI-RS RE. Unlike CRS in which the RE position at which CRS per antenna port is transmitted is fixed, CSI-RS has a maximum of 32 different constructions so as to reduce inter-cell interference (ICI) under a multi-cell environment including a heterogeneous network environment. Different CSI-RS constructions are made according to the number of antenna ports contained in the cell, and contiguous cells may be configured to have different structures. Unlike CRS, CSI-RS may support a maximum of 8 antenna ports (p=15, p=15, 16, p=15, . . . , 18, and p=15, . . . , 22), and CSI-RS may be defined only for $\Delta f=15$ kHz. The antenna ports (p=15, . . . , 22) may correspond to CSI-RS ports (p=0, . . . , 7), respectively.

CSI-RS configuration may be varies according to the number of CSI-RS ports configured. There are 20 CSI-RS configurations if 2 CSI-RS ports are configured, there are 10 CSI-RS configurations if 4 CSI-RS ports are configured, and there are 5 CSI-RS configurations if 8 CSI-RS ports are configured. Numbers may be assigned to respective CSI-RS configurations defined by the number of CSI-RS ports.

The CSI-RS structures have nested property. The nested property may indicate that a CSI-RS structure for a large number of CSI-RS ports is used as a super set of a CSI-RS structure for a small number of CSI-RS ports. For example, REs configured to construct CSI-RS structure #0 regarding 4 CSI-RS ports are contained in resources configured to construct CSI-RS structure #0 regarding 8 CSI-RS ports.

A plurality of CSI-RSs may be used in a given cell. In the case of non-zero power CSI-RS, only CSI-RS for one structure is transmitted. In the case of zero-power CSI-RS, CSI-RS of a plurality of structures can be transmitted. From among resources corresponding to the zero-power CSI-RS, the UE proposes zero transmit (Tx) power for resources other than resources to be proposed as non-zero power CSI-RS. For example, in the case of a radio frame for TDD, no CSI-RS is transmitted in any one of a special subframe in which DL transmission and UL transmission coexist, a subframe in which a paging message is transmitted, and a subframe in which transmission of a synchronous signal, physical broadcast channel (PBCH) or system information block type 1 (SIB1) collides with CSI-RS. The UE assumes that no CSI-RS is transmitted in the above subframes. Meanwhile, time-frequency resources used by the CSI-RS port for transmission of the corresponding CSI-RS are not used for PDSCH transmission, and are not used for CSI-RS transmission of other antenna ports instead of the corresponding CSI-RS port.

Time-frequency resources used for CSI-RS transmission are not used for data transmission, such that a data throughput is reduced in proportion to the increasing CSI-RS overhead. Considering this fact, CSI-RS is not constructed every subframe, and the CSI-RS is transmitted at intervals of a predetermined transmission period corresponding to a plurality of subframes. In this case, compared to the case in which CSI-RS is transmitted every subframe, the amount of CSI-RS transmission overhead can be greatly reduced. The above-mentioned subframe will hereinafter be referred to as a CSI-RS subframe configured for CSI-RS transmission.

A base station (BS) can inform a UE of the following parameters through higher layer signaling (e.g., MAC signaling, RRC signaling, etc.).

Number of CSI-RS ports
CSI-RS structure
CSI-RS subframe configuration $I_{CSI-RS}$
CSI-RS subframe configuration period $T_{CSI-RS}$
CSI-RS subframe offset $\Delta_{CSI-RS}$ If necessary, the BS (or eNB) may inform the UE of not only a CSI-RS configuration transmitted at zero power, but also a subframe used for transmission of the zero-power CSI-RS configuration.

CSI-IM (Interference Measurement)

Figure 5:
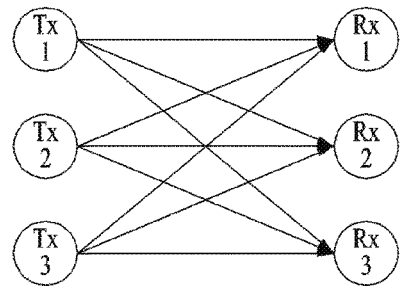
FIG. 5 shows basic transceiving operations of transmitting and receiving nodes assumed by an embodiment of the present invention.

For the 3GPP LTE Rel-11 UE, one or more CSI-IM resource structures may be configured. CSI-IM resource may be used to measure interference. The CSI-RS structure and the CSI-RS subframe structure (ICSI-RS) shown in FIG. 5 may be configured through higher layer signaling for each CSI-IM resource.

CSI Report

In a 3GPP LTE(-A) system, a user equipment (UE) reports channel state information (CSI) to a base station (BS) and CSI refers to information indicating quality of a radio channel (or a link) formed between the UE and an antenna port. For example, the CSI includes a rank indicator (RI), a precoding matrix indicator (PMI), a channel quality indicator (CQI), etc. Here, the RI indicates rank information of a channel and means the number of streams received by the UE via the same time-frequency resources. Since the value of the RI is determined depending on long term fading of the channel, the RI is fed from the UE back to the BS with periodicity longer than that of the PMI or the CQI. The PMI has a channel space property and indicates a precoding index preferred by the UE based on a metric such a signal to interference plus noise ratio (SINR). The CQI indicates the strength of the channel and means a reception SINR obtained when the BS uses the PMI.

Based on measurement of the radio channel, the UE may calculate a preferred PMI and RI, which may derive an optimal or best transfer rate when used by the BS, in a current channel state and feed the calculated PMI and RI back to the BS. The CQI refers to a modulation and coding scheme for providing acceptable packet error probability for the fed-back PMI/RI.

In a multi-cell environment wireless communication system having a plurality of cells (e.g., a base station, eNB (evolved Node B) or TP (transmission point)) exist therein, NAICS (network assisted interference cancelation and supression) scheme has been discussed recently as one of inter-cell interference mitigtaion schemes. For example, currently in LTE-A standardization, an SLIC (symbol-level interference cancelation) technology of removing a transmission signal of an adjacent cell in the symbol level in order to mitigate the effects of the downlink interference signal of the adjacent cell has been discussed. The UE can receive data at a high SINR by the canceled interference, which means that the UE can quickly receive data at a transmission rate improved than before.

It is known that a maximum DoF (degrees of freedom) can achieve ½ per user on an existing interference channel. This can be achieved using interference alignment. To this end, symbol extension amounting to infinite length is required and a transmitter should be completely aware of channel information on every interference channel. Moreover, when symbol extension is performed, channels should be independently and identically distributed (i.i.d.) from each other. Due to such assumptions, it is difficult to implement interference alignment in a real situation.

Meanwhile, there is ongoing study on a partially connected interference channel. Without channel information in a transmitter, ½ DoF can be achieved per node on some partially connected-interference channels, which is proved to be formulated into a wireless index coding problem. Yet, since the partial connection is not completely established in a real channel situation, a follow-up study is necessary. Therefore, the present invention intends to propose a scheme of achieving ½ DoF per node by establishing a desired partially connected interference channel through feedback and coordinated transmission on an interference channel having an access of an undesired pattern.

The description in the present specification is made on the assumption of 3 user interference channels. In this case, it is highly probable that path losses of all channels are not identical to each other. Particularly, a strength of an interference channel may be relatively weaker than that of a desired channel. And, if a strength of a channel is equal to or smaller than a predetermined strength in comparison with the required channel or an absolute strength of a channel is equal to or smaller than a predetermined strength, such a state shall be named an unconnected state.

According to the present invention, among 3 user interference channels like FIG. 4, a Tx node considers a partially connected interference channel in a situation that some channels enter an unconnected state through an operation such as muting or precoding.

According to one embodiment of the present invention, proposed are a coordinated transmission scheme of a Tx node and a feedback scheme of an Rx node, by which ½ DoF per node can be achieved in a manner of establishing a partially connected interference channel among 3 user interference channels.

First of all, in order to establish a partially connected interference channel to achieve ½ DoF per node on 3 user interference channels, a system using 2 units of specific time or frequency for a single modulated symbol is considered. According to 3GPP LTE standard, for example, if used resources are named RE (resource element) x and RE y, respectively, coordinated transmission operations between Tx nodes, which include transmission patterns of Tx nodes by utilizing muting and specific precoding, are performed as follows.

On RX x, one Tx node performs muting. The rest of 2 Tx nodes transmit signals.

On RE y, one of the two nodes failing to perform the muting on Rex performs muting. The rest of 2 Tx nodes transmit signals. In doing so, the Tx node failing to correspond to the muting on RE x and RE y all transmits the same signal using the RE x and RE y resources.

When Tx node having performed the muting on a specific RE transmits a signal on a remaining other RE, it transmits the signal by applying precoding which can avoid an interference effect on the rest of RX nodes except RX node of its own.

For clarity of the following description, Tx node failing to correspond to the muting on RE x and RE y all shall be named Tx 2. In this case, a signal transmission of each Tx node on RE x and RE y can be represented as a following table.

TABLE 5

|      | RE x     | RE y     |
|------|----------|----------|
| Tx 1 | symbol a | muting   |
| Tx 2 | symbol b | symbol b |
| Tx 3 | muting   | symbol c |

And, in the above table, a transmission pattern on RE x and a transmission pattern on RE y may be named a pattern A and a pattern B, respectively.

Such a configuration of the pattern for the Tx node signal transmission is determined in advance by an agreement between Txs. This configuration of the pattern for the signal transmission may be delivered in a manner of being determined by a center node configured to control scheduling of a multitude of Tx nodes. Or, a specific Tx node may receive information necessary for scheduling, determine a pattern, and then distribute the corresponding information to the rest of Tx nodes. The former case may be construed as "centralized coordination approach", the latter case may be construed as "distributed coordination approach", and the present invention is applicable to both of the cases or schemes. After the center node or the specific Tx node has determined the pattern configuration for the Tx node signal transmission, it can be delivered that the pattern is applied to a specific time/frequency resource (e.g., a specific subframe/frequency band or RB) determined through an inter-BS (base station) communication protocol such as X2 signaling.

For the aforementioned precoding, feedbacks of Rx nodes are required as follows.

In order to eliminate the interference effect caused to Rx 2 and Rx 3 by Tx 1 like the pattern A on RE x and enter an unconnected state, Rx 2 and Rx 3 feed back information on a precoding matrix/vector supposed to be used by Tx 1 to Tx 2 and then Tx 2 forwards this information to Tx 1 in backhaul link. Similarly, in order to eliminate the interference effect caused to Rx 1 and Rx 2 by Tx 3 like the pattern B on RE y and enter an unconnected state, Rx 1 and Rx 2 feed back information on a precoding matrix/vector supposed to be used by Tx 3 to Tx 2 and then Tx 2 forwards this information to Tx 3 in backhaul link.

Or, if dual connectivity currently discussed by LTE Standard is supportable, Rx nodes may directly feed back the precoding information to Tx node that will use such information.

Figure 6:
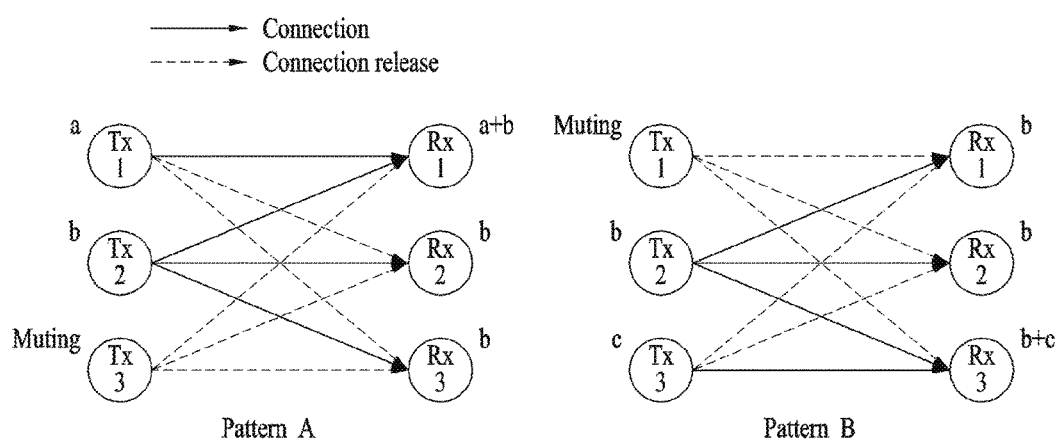
FIG. 6 shows transmitting and receiving pattern of the transmitting and receiving nodes shown in FIG. 5 according to one embodiment of the present invention.

In case that the operations of the Tx/Rx nodes are supported, signal transmissions on RE x and RE y may be represented as FIG. 6. Rx 1 may decode Symbol a that Tx 1 intends to send through Symbol a+b and Symbol b, and Rx 3 may decode Symbol c that Tx 1 intends to send through Symbol b and Symbol b+c. Hence, it is able to achieve ½ DoF per node using 2 resource units.

For the coordinated signal transmission, the following agreements in advance are required between Tx nodes and Rx nodes.

RE mapping to one modulated symbol

In order to establish the partially connected interference channels of 3 users and achieve ½ DoF per node, Tx node performs a transmission using 2 resource units for one modulated symbol and Rx node receives information on resource mapping according to an agreement with Tx node made in advance. Particularly, it is able to utilize 2 frequency or time resource units for one modulated symbol. If 3GPP LTE Standard is taken as one example, it is able to consider utilizing 2 REs. In order for the channel conditions for the pattern A transmission and the pattern B transmission not to be changed as small as possible, it may be preferable to use 2 resource units (e.g., 2 adjacent REs) corresponding to adjacent frequencies or times. For instance, if FIG. 6 is taken as one example, in case of Tx 2, the same modulated Symbol b is repeatedly transmitted on 2 resource units. In case of Tx 1 and Tx 3, after it is agreed in advance that muting resources do not overlap with each other, a modulated symbol is transmitted on one resource and muting is performed on the other resource.

Feedback configuration scheme for coordinated signal transmissions of adjacent Tx nodes according to signal transmission pattern Each Tx node configures a specific feedback suitable for a pattern of a coordinated signal transmission for Rx node belonging to or served by the corresponding Tx node.

In case of Tx 2, 1 CSI-RS and 3 CSI-IMs are configured for Rx 2 like the following table. These resources may be newly defined by a single CSI process, or may be configured by a plurality of CSI processes. Rx 2 is set to report RI, PMI and CQI, which are obtained through the above configuration, together with a recommended PMI to be used by Tx 1 and a recommended PMI to be used by Tx 3.

TABLE 6

| CSI-RS 0 | CSI-RS received from Tx 2 |
|---|---|
| CSI-IM 0 | Tx 1 and Tx 3 are set to configure zero-power CSI-RS. This is to measure interference in case of non-presence of interference from Tx 1 and Tx 3. Optimal RI, CQI and PMI to be used by Tx 2 are calculated from CSI-RS 0 and CSI-IM 0 and then reported. |
| CSI-IM 1 | Tx 2 and Tx 3 are set to configure zero-power CSI-RS. Rx 2 measures interference caused by Tx 1 on CSI-IM 1, calculates a beam capable of minimizing influence caused by an interference signal coming from Tx 1 through the measurement, and then selects PMI to be used for Pattern A by Tx 1. |
| CSI-IM 2 | Tx 2 and Tx 1 are set to configure zero-power CSI-RS. Similarly, Rx 2 measures interference caused by Tx 3 on CSI-IM 2, calculates a beam capable of minimizing influence caused by an interference signal coming from Tx 3 through the measurement, and then selects PMI to be used for Pattern B by Tx 3. |

In case of Tx 1, 1 CSI-RS and 2 CSI-IMs are configured for Rx 1 like the following table. These resources may be newly defined by a single CSI process, or may be configured by a plurality of CSI processes. Rx 1 is set to report RI, PMI and CQI, which are obtained through the above configuration, together with a recommended PMI to be used by Tx 3.

TABLE 7

| CSI-RS 0 | CSI-RS received from Tx 1 |
|---|---|
| CSI-IM 0 | Tx 1 and Tx 3 are set to configure zero-power CSI-RS. This is to measure interference in case of non-presence of interference from Tx 3. Rx 1 calculates optimal RI, CQI and PMI to be used for Pattern A by Tx 1 from CSI-RS 0 and CSI-IM 0 and then reports them. |
| CSI-IM 1 | Tx 1 and Tx 2 are set to configure zero-power CSI-RS. Rx 1 measures an interference channel, which comes from Tx 3, on CSI-IM 1, calculates a beam capable of minimizing influence caused by an interference signal coming from Tx 3 through the measurement, and then selects PMI to be used for Pattern B by Tx 3. |

In case of Tx 3, 1 CSI-RS and 2 CSI-IMs are configured for Rx 3 like the following table. These resources may be newly defined by a single CSI process, or may be configured by a plurality of CSI processes. Rx 3 is set to report RI, PMI and CQI, which are obtained through the above configuration, together with a recommended PMI to be used by Tx 1

TABLE 8

| | |
|---|---|
| CSI-RS 0 | CSI-RS received from Tx 3 |
| CSI-IM 0 | Tx 3 and Tx 1 are set to configure zero-power CSI-RS. This is to measure interference in case of non-presence of interference from Tx 1. Rx 3 calculates optimal RI, CQI and PMI to be used for a situation of Pattern B by Tx 3 from CSI-RS 0 and CSI-IM 0 and then reports them. |
| CSI-IM 1 | Tx 3 and Tx 2 are set to configure zero-power CSI-RS. Rx 3 measures an interference channel coming from Tx 1, finds a beam capable of minimizing influence caused by an interference signal coming from Tx 1 through the measurement, and then selects PMI to be used for Pattern A by Tx 1. |

Figure 7:
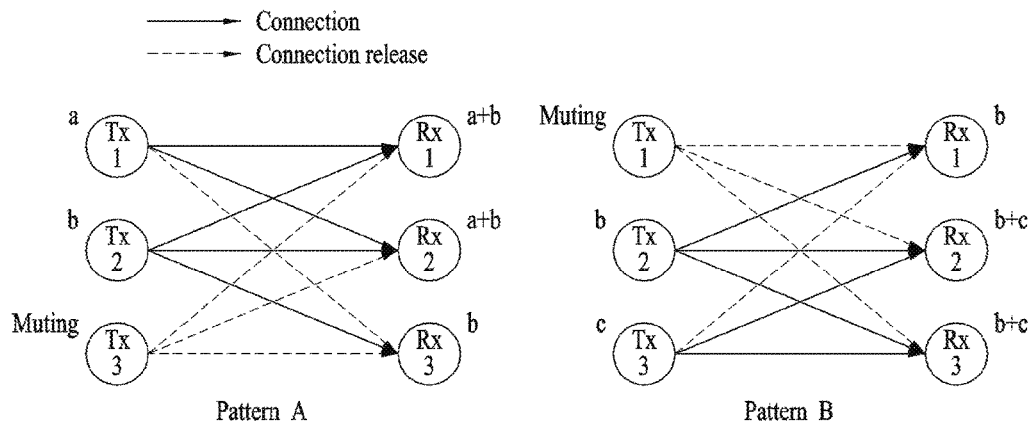
FIG. 7 shows transmitting and receiving pattern of the transmitting and receiving nodes shown in FIG. 5 according to one embodiment of the present invention.

Although the above-described transmission pattern is just one example of the partially connected interference channels of 3 users shown in FIG. 6, it can be modified and applied to partially connected interference channels of 3 users shown in FIG. 7.

In FIG. 7, Rx 2 receives undesired interference (e.g., Symbol a and Symbol c). And, it is assumed that such interference can be cancelled/suppressed through a receiver related technology (e.g., MMSE-IRC Minimum Mean Square Error Interference Rejection Combining), symbol level IC (interference cancellation), etc.) by utilizing a plurality of Rx antennas. For instance, a coordinated transmission can be performed by designating Rx node, which has high interference control capability among 3 Rx nodes, as Rx 2.

In this case, when Tx node muted on a specific RE transmits a signal on a remaining other RE, it is enough for the Tx node to transmit the signal by only applying a precoding capable of not causing an interference effect to some of the rest of Rx nodes except the Rx node of its own. In particular, in case of Pattern A shown in FIG. 7, Tx 1 uses a precoding capable of not causing an interference to Rx 3 only. And, in case of Pattern B shown in FIG. 7, Tx 3 uses a precoding capable of not causing an interference to Rx 1 only. Hence, it is unnecessary to configure CSI-IM 1 and CSI-IM 2 among the CSI-IM configurations for Rx 2 in Table 6.

Figure 8:
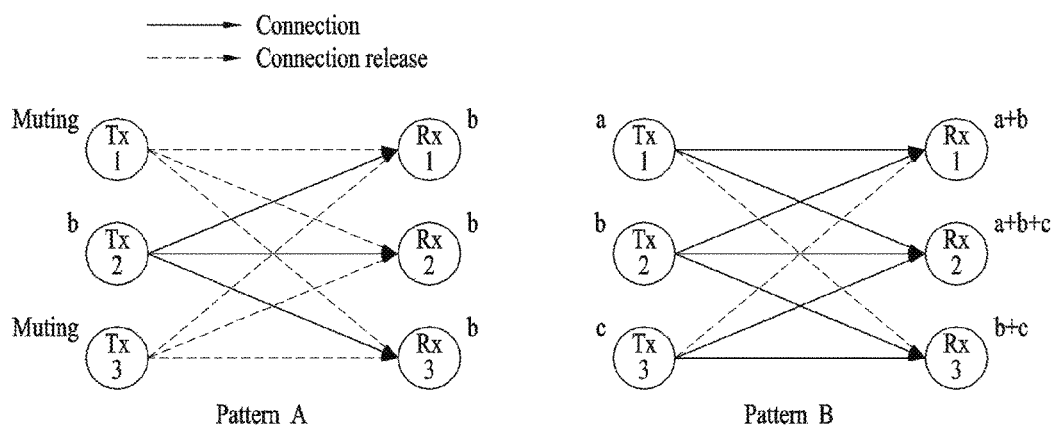
FIG. 8 shows transmitting and receiving pattern of the transmitting and receiving nodes shown in FIG. 5 according to one embodiment of the present invention.

Moreover, an embodiment of the present invention can be modified and applied to connections of partially connected interference channels of 3 users like FIG. 8 as well.

In this case, the aforementioned transmission patterns of the Tx nodes in table 5 can be modified as follows.

On RE x, one Tx node transmits a signal and the rest 2 Tx nodes perform muting.

On RE y, all Tx nodes transmit signals. In doing so, Tx node transmitting signals on both RE x and RE y transmits the same signal using RE x and RE y.

When Tx node having performed a muting on a specific RE transmits a signal on a remaining other RE, the Tx node transmits the signal by applying a precoding capable of not causing an interference effect to some of the rest of Rx nodes except Rx node of its own. For instance, like Pattern B shown in FIG. 8, Tx 1 uses a precoding capable of not causing an interference effect to Rx 3 but Tx 3 uses a precoding capable of not causing an effect to Rx 1.

Or, when Tx node having performed a muting on a specific RE transmits a signal on a remaining other RE, the Tx node transmits the signal by applying a precoding capable of not causing an interference effect to the rest of 2 Rx nodes except Rx node of its own.

TABLE 9

| | RE x | RE y |
|---|---|---|
| Tx 1 | muting | symbol a |
| Tx 2 | symbol b | symbol b |
| Tx 3 | muting | symbol c |

In case of the transmission pattern according to FIG. 8, the same feedback configuration of the transmission pattern shown in FIG. 7 is necessary as well.

Figure 9:
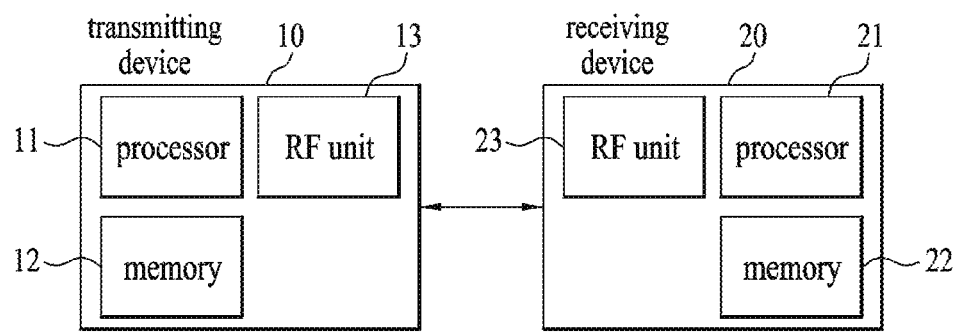
FIG. 9 is a block diagram of a device for implementing embodiment(s) of the present invention.

FIG. 9 is a block diagram of a transmitting device 10 and a receiving device 20 configured to implement exemplary embodiments of the present invention. Referring to FIG. 9, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmission device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a user equipment (UE), a relay and an eNB.

What is claimed is:

1. A method for a first transmitting node to transmit a radio signal to three receiving nodes respectively served by the first transmitting node, a second transmitting node and a third transmitting node in coordination with the second and third transmitting nodes using two radio resource units in a wireless communication system, the method performed by the first transmitting node, the method comprising:

configuring a channel state information-reference signal (CSI-RS) resource and a CSI-interference measurement (CSI-IM) resource for a first receiving node of the three receiving nodes;

receiving a recommended precoding matrix index (PMI) for the first transmitting node including a first recommended PMI and a second recommended PMI, wherein the first recommended PMI is received from the first receiving node and is determined based on information measured on the CSI-RS resource and the CSI-IM resource and the second recommended PMI is received from at least one of the second transmitting node or the third transmitting node after having been respectively reported by second and third receiving nodes of the three receiving nodes;

transmitting a first signal in a first radio resource unit of the two radio resource units based either on the first recommended PMI or on the second recommended PMI; and muting the first signal in a second radio resource unit of the two radio resource units, wherein the second transmitting node transmits a second signal to the three receiving nodes in both of the two radio resource units, wherein the third transmitting node mutes a third signal in the first radio resource unit and transmits the third signal in the second radio resource unit, and wherein the first recommended PMI indicates a precoding matrix that does not cause an interference to at least one of the second receiving node or the third receiving node.

2. The method of claim 1, wherein the CSI-IM resource comprises a first CSI-IM resource designated for the first transmitting node and the third transmitting node to transmit a zero-power CSI-RS and a second CSI-IM resource designated for the first transmitting node and the second transmitting node to transmit the zero-power CSI-RS.

3. The method of claim 2, wherein a recommended PMI to be used for the second radio resource unit by the first transmitting node is determined by the first receiving node using the information measured on the first CSI-IM resource and the information measured on the CSI-RS resource.

4. The method of claim 2, wherein a recommended PMI to be used for the first radio resource unit by the third transmitting node is determined by the first receiving node using the information measured on the second CSI-IM resource.

5. The method of claim 1, further comprising receiving a recommended PMI for the third transmitting node from the first receiving node.

6. The method of claim 1, wherein the first radio resource unit and the second radio resource unit are contiguous with each other in a time or frequency domain.

7. The method of claim 1, wherein the three transmitting nodes transmit different radio signals either in the first radio resource unit or in the second radio resource unit, respectively.

8. A method of receiving a radio signal from three transmitting nodes configured to coordinate with each other using two radio resource units in a wireless communication system, the method performed by a first receiving node among three receiving nodes, the method comprising:

receiving configurations of a channel state information-reference signal (CSI-RS) resource and a CSI-interference measurement (CSI-IM) resource from a first transmitting node of the three transmitting nodes;

reporting a recommended precoding matrix index (PMI) for the first transmitting node according to information measured on the CSI-RS resource and the CSI-IM resource and a recommended PMI for a second transmitting node or a third transmitting node of the three transmitting nodes to the first transmitting node;

receiving a first signal from the first transmitting node and a second signal from the second transmitting node in a first radio resource unit of the two radio resource units based on the recommended PMI; and receiving the second signal from the second transmitting node in a second radio resource unit of the two radio resource units based on the recommended PMI, wherein the second transmitting node transmits the second signal to the three receiving nodes in both of the two radio resource units, wherein the third transmitting node mutes a third signal in the first radio resource unit and transmits the third signal in the second radio resource unit, and wherein the recommended PMI for the first transmitting node indicates a precoding matrix that does not cause an interference to at least one of a second receiving node or a third receiving node of the three receiving nodes.

9. The method of claim 8, wherein the CSI-IM resource comprises a first CSI-IM resource designated for the first transmitting node and the third transmitting node to transmit a zero-power CSI-RS and a second CSI-IM resource designated for the first transmitting node and the second transmitting node to transmit the zero-power CSI-RS.

10. The method of claim 9, wherein a recommended PMI to be used for the second radio resource unit by the first transmitting node is determined by the first receiving node using the information measured on the first CSI-IM resource and the information measured on the CSI-RS resource.

11. The method of claim 9, wherein a recommended PMI to be used for the first radio resource unit by the third transmitting node is determined by the first receiving node using the information measured on the second CSI-IM resource.

12. The method of claim 8, further comprising transmitting a recommended PMI for the third transmitting node to the first transmitting node.

13. The method of claim 8, wherein the first radio resource unit and the second radio resource unit are contiguous with each other in a time or frequency domain.

14. The method of claim 8, wherein the three transmitting nodes transmit different radio signals either in the first radio resource unit or in the second radio resource unit, respectively.

15. A first transmitting node configured to transmit a radio signal to three receiving nodes respectively served by the first transmitting node, a second transmitting node and a third transmitting node in coordination with the second and third transmitting nodes using two radio resource units in a wireless communication system, the method performed by the first transmitting node, the first transmitting node comprising:

a transceiver; and a processor operatively connected to the transceiver and configured to:

configure a channel state information-reference signal (CSI-RS) resource and a CSI-interference measurement (CSI-IM) resource for a first receiving node of the three receiving nodes;

receive a recommended precoding matrix index (PMI) for the first transmitting node including a first recommended PMI and a second recommended PMI, wherein the first recommended PMI is received from the first receiving node and is determined based on information measured on the CSI-RS resource and the CSI-IM resource and the second recommended PMI is received from at least one of the second transmitting node or the third transmitting node after having been respectively reported by second and third receiving nodes of the three receiving nodes;

transmit a first signal in a first radio resource unit of the two radio resource units based either on the first recommended PMI or on the second recommended PMI; and mute the first signal in a second radio resource unit of the two radio resource units, wherein the second transmitting node transmits a second signal to the three receiving nodes in both of the two radio resource units, wherein the third transmitting node mutes a third signal in the first radio resource unit and transmits the third signal in the second radio resource unit, and wherein the first recommended PMI indicates a precoding matrix that does not cause an interference to at least one of the second receiving node or the third receiving node.

* * * * *